United States Patent [19]

Douglas

[11] 4,078,992

[45] Mar. 14, 1978

[54] PROCESS FOR OXIDATION OF MERCAPTANS IN HYDROCARBON DISTILLATES AND IN AKALINE MEDIUM

[75] Inventor: Walter M. Douglas, Mount Prospect, Ill.

[73] Assignee: UOP Inc., Des Plaines, Ill.

[21] Appl. No.: 788,372

[22] Filed: Apr. 18, 1977

Related U.S. Application Data

[63] Continuation-in-part of Ser. No. 659,394, Feb. 19, 1976, Pat. No. 4,048,097.

[51] Int. Cl.$^2$ ............................................. C10G 27/06
[52] U.S. Cl. ...................................... 208/206; 260/608
[58] Field of Search ............................... 208/206, 207; 252/431 N; 260/608

[56] References Cited

U.S. PATENT DOCUMENTS

| 2,988,500 | 6/1961 | Gleim et al. | 208/206 |
|---|---|---|---|
| 3,230,180 | 1/1966 | Larson | 208/207 |
| 3,565,959 | 2/1971 | Takase et al. | 252/431 N |

*Primary Examiner*—George Crasanakis
*Attorney, Agent, or Firm*—James R. Hoatson, Jr.; Richard D. Stone; William H. Page, II

[57] ABSTRACT

A new metal phthalocyanine catalyst is prepared by reacting a 4-sulfophthalic compound, a metal salt, an ammonium donor compound and water at reaction conditions which include heating to 255° to 325° C at a pressure of 1 to 100 atmospheres for one-half to ten hours. The catalyst is used to oxidize mercaptans.

10 Claims, No Drawings

PROCESS FOR OXIDATION OF MERCAPTANS IN HYDROCARBON DISTILLATES AND IN AKALINE MEDIUM

CROSS REFERENCE TO RELATED APPLICATION

This application is a continuation-in-part of my co-pending application Ser. No. 659,394, filed on Feb. 19, 1976, now U.S. Pat. No. 4,048,097, the teachings of which are incorporated by reference.

BACKGROUND OF THE INVENTION

1. Field of the Invention

The invention relates to a new catalyst and its use in the treatment of hydrocarbon distillates, and particularly to an improved method of sweetening sour hydrocarbon distillates by oxidizing the mercaptans in the distillate to disulfides in the presence of a phthalocyanine catalyst.

2. Prior Art

The fixed bed sweetening of hydrocarbons is well known in the art. A typical fixed bed sweetening process is disclosed in U.S. Pat. No. 2,988,500 (Class 208–206), the teachings of which are incorporated by reference. In this patent, a sour petroleum distillate is contacted with a fixed bed of a metal phthalocyanine catalyst composited with a charcoal carrier in the presence of oxygen and an alkaline reagent.

The advantage of a fixed bed treating process is that the refiner has a high degree of control over the sweetening operation, and can be reasonably sure that all of the hydrocarbon passing through his fixed bed treating unit will be treated.

Liquid-liquid sweetening is also well known in the refining arts. In this process a metal chelate is dispersed or dissolved in an alkaline medium. The alkaline medium can be used to extract mercaptans from a hydrocarbon stream, with regeneration of the alkaline medium via oxidation of mercaptans to disulfides occurring in a separate vessel. Alternatively, the hydrocarbon, alkaline medium with catalyst, and an oxidizing agent may be contacted in a single vessel. U.S. Pat. No. 3,853,432 (Class 196-32), the teachings of which are incorporated by reference, discloses many details of catalysts and alkaline mediums which may be used. This patent also teaches that it is desirable to use a sulfonated derivative of a metal phthalocyanine to increase the solubility of the phthalocyanine catalyst in the alkaline medium.

A feature common to both fixed bed sweetening and liquid-liquid sweetening is use of a metal phthalocyanine catalyst. Many methods of metal phthalocyanine preparation are known in the art. One such method of preparation comprises contacting metal hydroxide with quinoline in an inert organic solvent and subsequently adding a solution containing a phthalonitrile to obtain the desired phthalocyanine compound. The metal phthalocyanines can be halogenated by various procedures such as U.S. Pat. Nos. 3,393,200 and 3,252,992. Further, U.S. Pat. No. 3,074,958 discloses a method for the preparation of a metal phthalocyanine compound by heating a mixture containing a phthalic acid, urea or a nitrogen donor, a metal donor and ammonium chloride to improve the yield of the metal phthalocyanine compound.

Because of the interest in making metal phthalocyanines soluble, especially for use in liquid-liquid sweetening processes, much work has been done towards preparing sulfonated derivatives of metal phthalocyanines. Perhaps an even greater amount of work with metal phthalocyanine has occurred because of the interest in these compounds as dyes and pigments.

Only two basic methods of forming sulfonated derivatives of metal phthalocyanines are known. Perhaps the oldest method is sulfonation in oleum. One example of a sulfonation method is given in U.K. Patent Specification No. 503,029, which teaches a way to prepare copper phthalocyanines, followed by reaction of the phthalocyanines with sulfuric acid to produce a product termed a sulphate. Preparation of 4-sulfonated copper phthalocyanines is disclosed in Sekiguchi, et al, Chem. Abstracts, Volume 71, Item 1031530 (1969), wherein a tetrasulfonate is made by first making the phthalocyanine and then sulfonating in oleum or sulfuric acid.

Day, in J. Chem. Soc. (A), 90 (1963), disclosed preperation of a cobalt phthalocyanine tetrasulfonate from cobalt phthalocyanine by sulfonation in sulfuric acid and oleum. Borisenkova, et al, ZH. Organicheskoi Khim., 9,1822–1830 (1973), also disclosed preparation of phthalocyanines by the reaction of metal powder with phthalonitrile. The phthalocyanines were prepared using nitrobenzene as a solvent. This material was sulfonated using oleum.

A second category or type of preparation of sulfonated derivatives of phthalocyanine involves preparing a phthalocyanine with reactants already containing a sulfur moiety. In this methods any phthalocyanine prepared is automatically a sulfonated phthalocyanine. Basically, the catalyst of the present invention is an improved product of the latter procedure, i.e., a method wherein reactants containing sulfur moieties produce a sulfonated phthalocyanine.

Before discussing in detail my invention, I will briefly discuss the closest prior art preparation methods known. Fukada, in Nippon Kagoku Zasshi 79, 396-9 (1958), shows various methods of preparation of phthalocyanine tetrasulfonates. Fukada basically prepares his tetrasulfonate using tri-ammonium-4-sulfophthalate. He discloses reacting his reactants at 240° C. Various modifications of Fukada's method have been proposed — including Webber and Busch's modification disclosed in Inorg. Chem. 4, 469–71 (1965), Ibid, 472–5, wherein nitrobenzene is used as a solvent. Another variation upon the Fukada theme is disclosed by Kundo, et al, Kinet Katal 8 1325–30 (1967), which discloses a melt, or dry, reaction which occurs at 200° to 210° C for six hours. Kundo discloses that his catalyst can convert cysteine to cystine. This is an example of conversion of a mercaptan to a disulfide, though this occurred in a biological system involving an amino acid.

Another closely related method of preparing sulfonated phthalocyanines is disclosed by Przywarska-Boniecka, Rocz. Chem. 41, 1703–10 (1967), which discloses a method similar to Fukada's, but mentions that the maximum reaction temperature should be 240° C. The metal used in the study was rhenium. Oxidation of mercaptans was not studied.

Primarily in an effort to find an improved catalyst for the conversion of mercaptans, I studied the work that others had done with a view to finding not only a better mercaptan conversion process, but if possible, a better way to make catalyst to be used in the process. The existing catalyst preparation methods where not completely satisfactory because the preparation of the catalyst in oleum or sulfuric acid is very messy, and involves the use of dangerous reagents (sulfuric acid), and the product of the reaction must be purified before it can be used. In addition, the catalytic activity of sulfonated derivatives of phthalocyanine catalysts prepared via sulfonation in oleum, or sulfuric acid, was not quite as high as desired. The other general way of making tetrasulfonate, which will be called the Fukada method for want of a more generic term, permitted considerable improvement over direct sulfonation methods, in that use and disposal of sulfuric acid was avoided, and some of the purification steps could be eliminated. Unfortunately, the catalysts prepared by the Fukada methods where not quite as active for the conversion of mercaptans as desired.

Accordingly, I attempted to find a way to make phthalocyanine tetrasulfonates which would avoid the onerous preparation methods involved in direct sulfonation, and which would also produce a catalyst with greater activity than that prepared by either direct sulfonation or a Fukada method.

Accordingly, the present invention provides a composition of matter comprising a metal phthalocyanine composition of matter prepared by reacting a 4-sulfophthalic compound, a metal salt, an ammonium donor compound and water at 255° to 325° C for one-half to ten hours.

In another embodiment the present invention provides a method of catalyst manufacture which comprises reacting a 4-sulfophthalic compound, a metal salt, an ammonium donor compound and water at 255° to 325° C for one-half to ten hours.

In yet another embodiment, the present invention provides in a process for the oxidation of a sulfur-containing compound with oxygen or oxygen containing gas in the presence of a catalyst and an alkaline medium, the improvement comprising use of a catalyst comprising a composition of matter comprising a metal phthalocyanine composition of matter prepared by reacting a 4-sulfophthalic compound, a metal salt, an ammonium donor compound and water at 255° to 325° C for one-half to ten hours.

The present invention provides the refiner and chemical manufacturer an improved method for the removal or conversion of sulfur-containing compounds from various charge stocks.

One of the worst sulfur-containing compounds is mercaptan. The types of mercaptan vary depending on the type of charge stock. In natural gas, methyl mercaptan or ethyl mercaptan may be present. In heavier crude oil or kerosene charge stocks, tertiary dodecyl mercaptan or aromatic mercaptans such as thiophenol may be present in the charge stock. The utilization of the present invention will allow the manufacturer and refiner a better method of removal and conversion of the different mercaptan compounds.

Another offensive sulfur-containing compound is hydrogen sulfide. Hydrogen sulfide may be produced in the refining of crude oil, chemical manufacturing or in steel production. The utilization of the catalyst of this invention will allow more efficient conversion of hydrogen sulfide to elemental sulfur by oxidation. The present invention will allow the manufacturer of metal phthalocyanine catalyst a more feasible manner of preparation to obtain a more desirable catalytic product.

The utility of the new catalyst resides in its use as a catalyst in the oxidation of sulfur compounds, e.g., conversion of sour smelling mercaptan compounds to disulfide compounds or conversion of dangerous hydrogen sulfide gas to elemental sulfur. The catalyst may also be used in various electrochemical reactions, biochemical reactions, hydroformylation reactions, reforming, alkylation, transalkylation, Diels Alders reactions, cycloalkylation, dehydrogenation, decyclodehydrogenations, oxidation of various organic compounds to ketones and carboxylic acids, reduction of inorganic and organic compounds in aqueous or organic solutions, etc.

When the catalyst of the present invention is used in mercaptan conversion, the treatment conditions will include a temperature of 0° to 500° C, a pressure of 1 to 100 atmospheres, absolute, and preferably sufficient to maintain liquid phase. Oxidizing agents which can be used include pure oxygen or oxygen mixed with another gas such as oxygen-nitrogen mixtures (air), etc.

The sulfur compounds converted may be either in pure form or intermixed in a petroleum charge stock or distillate, an aqueous charge stream or an alkali-aqueous charge stream. Mercaptans in petroleum hydrocarbons vary from mercaptans possessing 1 to 19 carbon atoms. Other mercaptan compounds which may also be present include aromatic mercaptans such as thiophenol or substituted thiophenol or branched-chain aliphatic hard to treat mercaptans such as tertiary dodecyl mercaptan. The sulfur-containing compounds comprise hydrogen sulfide, dissolved in an aqueous solution, e.g., hydrogen sulfide dissolved in sodium or calcium hydroxide or in water.

In a preferred embodiment, the sulfur compound is converted in an alkaline medium of pH 8 to 14, preferably a pH of 11 to 14. The catalyst may be dispersed on a solid support, e.g., charcoal or other carrier, or dispersed within an alkaline liquid medium.

The alkaline medium may be any of the conventional alkaline mediums used in treating processes. Usually sodium hydroxide is used because it is cheap.

The essence of the present invention is operation of the reaction zone wherein the catalyst precursor materials are present at a temperature of 255° to 325° C. Preferably, the pressure is sufficient to maintain liquid phase operation. The time of reaction may range from one-half to ten hours.

It is also within the scope of the present invention to increase temperature gradually to the specified temperature of 255° to 325° C. My experiments indicate that this is not a preferred method, when maximum mercaptan oxidation activity is desired. It is, however, possible to go through one or more preliminary heating steps at lower temperatures, e.g., 120° to 150° C for one-half to two hours, followed by 150° to 250° C for one-half to two hours, followed by the temperature range of the present invention. It may be desirable to build up slowly to the temperature range specified, 255° to 325° C, to allow some of the gaseous materials generated by phase change or chemical reaction to be removed. I do not completely understand what is going on at temperatures above 255° C, as opposed to the lower temperatures of the prior art methods, but have observed that a different product is obtained.

It is surprising that in all of the work done with sulfonated derivatives of phthalocyanines, no work was done at these elevated temperatures. There is a tendency for these materials to auto-incinerate at higher temperatures. For this reason, most researchers avoided temperatures above 240° C. Operation at temperatures less than 255° C will not produce enough of the desired product to show an increase in catalytic activity for the oxidation of mercaptans. The product produced substituting a low temperature reaction for that of the present invention would be very close to chemical properties to prior art catalysts, i.e., Fukada and Kundo. Operation at temperatures above 325° C is not believed possible because the material would almost certainly auto-incinerate at such elevated temperatures. Operation at temperatures 310° to 325° C may only be possible if elaborate precautions are taken to exclude the presence of oxygen gas from the mixture, or if excess water and pressure is supplied.

The reaction may be promoted by a promoter, e.g., boric acid, ammonium chromate, chromic oxide, selenic acid, ammonium chloride, ferric chloride, potassium vanadate, vanadic acid, lead monoxide, lead dioxide, zinc oxide, arsenic oxide, antimony oxide, molybdic oxide, phosphomolybdic acid, molybdic acid, ammonium molybdate, etc.

The reactants used include 4-sulfophthalic acid and derivatives thereof such as acid salts. The 4-sulfophthalate salts may also possess a cation of such elements as lithium, potassium, rubidium, cesium, barium, strontium, calcium, magnesium, beryllium, titanium, scandium, zirconium, manganese, rhenium, said salt exemplified by sodium-4-sulfophthalate, disodium-4-sulfophthalate, trisodium-4-sulfophthalate, lithium-4-sulfophthalate, dilithium-4-sulfophthalate, beryllium-4-sulfophthalate, magnesium-4-sulfophthalate, calcium-4-sulfophthalate, potassium-4-sulfophthalate, dipotassium-4-sulfophthalate, scandium-4-sulfophthalate, titanium-4-sulfophthalate, manganese-4-sulfophthalate, etc.

The metal salt may comprise any metal salt from Group VIII of the Periodic Table such as cobalt sulfate, cobaltous acetate, cobaltous chloride, cobaltic dichloride, cobalt sulfate, cobalt sulfate heptahydrate, cobaltous ammonium chloride, cobaltous ammonium sulfate, cobaltous bromide, cobaltous iodide, cobaltous nitrate, cobaltous sulfate, nickel ammonium chloride, etc., and corresponding compounds of ruthenium, rhodium, palladium, platinum, osmium, and iridium. In addition to the Group VIII metals, it is believed that other metal salts desired from vanadium, chromium, molybdenum, tungsten, zirconium, scandium, titanium, manganese, and zinc may also be used. The metal used within the metal phthalocyanine catalyst may also be derived from a metal salt that is formed from the metal powder, dust, or moss during the course of the reaction.

The ammonium donor compound will decompose to form ammonia or an ammonium moiety ($NH_4^+$). Suitable ammonium donor compounds include urea, alum ammonium chrome, alum ammonium iron, alum cesium, alum potassium (Kalinide), alum potassium manganese, alum rubidium, alum sodium, alum thallium, alum ammonium acetate, ammonia benzoate, ammonium borate, ammonium chromate, ammonium nitrate, ammonium gallate, hydrazine, urea calcium fluoride, urea hydrochloride, urea nitrate, etc.

The metal phthalocyanine compound which is prepared by the method of this invention will comprise a sulfonated iron phthalocyanine, cobalt phthalocyanine, nickel phthalocyanine, palladium phthalocyanine, rhodium phthalocyanine, ruthenium phthalocyanine, osmium phthalocyanine, iridium phthalocyanine, platinum phthalocyanine, vanadium phthalocyanine, manganese phthalocyanine, etc.

The 4-sulfophthalic acid salts, metal salts, promoter compositions of matter, sulfur-containing compounds, alkali-reaction mediums, and ammonium donor compounds mentioned are only representative of the type of compounds which may be employed in the present invention and are not necessarily limited thereto.

The catalyst preparation may either be a batch or continuous process. In a continuous process, the reactants may contact one another in a plug flow reactor, a continuous stirred tank reactor, or combination thereof, maintained at suitable temperatures and pressures for a time sufficient to form the desired catalytic material. A batch process, as described in the examples or a modification thereof, may also be used.

Treatment of the sulfur-containing compounds may be effected in any suitable manner and may comprise a batch or a continuous type process. A continuous process, such as described in U.S. Pat. No. 2,988,500, i.e., a fixed bed treating process, is an acceptable way to treat mercaptan containing charge stocks, however the catalyst of the present invention is relatively soluble in alkaline mediums. This solubility is more of an advantage in a liquid-liquid sweetening process because it permits almost complete use of the catalyst. Descriptions of use of a catalyst in liquid phase operation are disclosed in U.S. Pat. Nos. 2,853,432 and 2,882,224, the teachings of which are incorporated by reference.

EXAMPLE I

In this example a catalyst was prepared by the Fukada method. In a reaction beaker were mixed 20.0 g (0.067 moles) triammonium 4-sulfophthalate, 30.0 g (0.5 moles) urea, 5.31 g (0.0189 moles) cobalt sulfate heptahydrate, 0.3 g ammonium molybdate and 30.0 g water. The mixture was incrementally heated from 120° to 220° C over 6 hours at atmospheric pressure. The reaction mass was then cooled and ground to a powdered material, called catalyst A.

The cobalt phthalocyanine sulfonates produced by the various synthetic methods are tested for their ability to oxidize thiophenol to diphenyl disulfide. In a typical test, exactly 8.1 mg of the catalyst is dissolved in 50 ml of 8 wt-% NaOH and transferred to a 100 ml round bottom flask which contains a magnetic stirring bar. A 20 ml sample of iso-octane containing 1.28 gm of thiophenol is added to the flask. The flask is then put on the oxygen uptake apparatus and the entire system is purged with oxygen. An initial reading of the gas buret is taken. The stirring is started and is continued throughout the experiment. Readings are taken on the gas buret every 2.5 minutes. The oxidation of the thiophenol is completed when uptake of oxygen ceases. The activity of the catalyst is determined by the time required to oxidize the 1.28 g of thiophenol. A good catalyst will require 14–20 minutes whereas a bad one may require more than one hour. The reaction occurs at room temperature, about 22° C in these tests. The time required with catalyst A to convert the thiophenol to its corresponding disulfide was 37.5 minutes.

EXAMPLE II

This example shows how to make a catalyst using a modification of Fukada's method as taught by Kundo. An example of this method, a dry melt method, is to mix 302 g of triammonium-4-sulfophthalate, 976 g of urea, 142 g of cobalt sulfate heptahydrate, and 0.5 g of ammonium molybdate. From the above mixture, a 450 g aliquot is charged into a 2 liter container which is then heated at 220°–235° C for 4.75 hr. The reaction product is allowed to cool, removed from the reactor, and powdered prior to testing its activity. This was catalyst B.

The mercaptan oxidation activity of this catalyst was tested for the conversion of thiophenol to its corresponding disulfide in the presence of oxygen. The time required to convert 1.28 g of thiophenol to its corresponding disulfide was 29 minutes.

EXAMPLE III

In this example a catalyst was prepared by the mixing in a beaker of 20 g (0.67 moles) triammonium-4-sulfophthalate, 30.0 g (0.5 moles) urea, 5.31 g (0.0189 moles) cobalt sulfate heptahydrate, 0.3 g ammonium molybdate and 30.0 g water. The reactant mixture was heated in a sand bath at 160°-170° C for two hours, heated at a temperature of 210° to 220° C for two hours. Reactants were then heated to 260° to 270° C for two hours. The reaction mixture was then cooled. The reaction mass was blue-black material. It was ground to a powdered material. This was catalyst C.

The thiophenol conversion time for this catalyst was 25 minutes. To confirm the improved results, a duplicate catalyst was prepared and tested. The thiophenol conversion time was 22 minutes.

EXAMPLE IV

This example shows a preferred way of making catalyst of the present invention. 20 g tri-ammonium 4-sulfophthalate, 5.31 g cobalt sulfate heptahydrate, 30 g urea, 0.3 g ammonium molybdate, and 30 g water were stirred together, then heated to about 265 for 4.5 hours. This catalyst, catalyst D, had a thiophenol conversion time of 20 minutes.

EXAMPLE V

This example shows the best way known of making catalyst of the present invention. The same reagents used in Example IV were stirred and heated to 270° C for five hours. The catalyst, catalyst E, had a thiophenol conversion time of 15 minutes.

Accordingly, from the experiments, a very active catalyst has been produced without the mess and danger of direct sulfonation in oleum, and with mercaptan conversion activity greatly exceeding that of related prior art catalyst preparation methods. This higher activity, may be better appreciated by considering that almost twice (29/15) as much prior art catalyst (Catalyst B) would be needed in a commercial sweetening process to accomplish the same amount of mercaptan conversion as catalyst of the present invention (Catalyst E).

EXAMPLE VI

In this example 226 kg. of cobalt phthalocyanine tetrasulphonate catalyst are prepared. 0.1 kg. of molybdic acid and 73 kg. of cobalt sulphate are dissolved in 465 kg. of a 50 wt.% solution of 4-sulphophthalic acid. 315 kg. of urea are then added and dissolved. The solution is loaded into trays and then transferred into an oven. The reaction temperature followed is (a) 177° C for 2 hours; (b) 218° C for 2 hours; and (c) 260° C for 4 hours. The oven is allowed to cool and the trays are removed for unloading. The product is ground and packaged. The catalyst, catalyst F, has a thiophenol conversion time of 15 minutes.

The above is a procedure for a commercial manufacturing plant for the cobalt phthalocyanine tetrasulphonate catalyst. It is noted that this procedure is covered by the teachings of the present application since the last heating stage, stage (c), is within the present claim 1.

I claim as my invention:

1. In a process for the oxidation of a mercaptan-containing hydrocarbon distillate with oxygen or oxygen-containing gas an alkaline medium and a metal phthalocyanine catalyst, the improvement comprising said catalyst of a metal phthalocyanine composition being prepared by reacting (a) a 4-sulfophthalic acid or salt thereof, with (b) a metal salt selected from the group consisting of a Group VIII metal, vanadium and manganese, (c) an ammonium donor compound decomposable to ammonia or ammonium moiety, and (d) water, at a temperature of 255° to 325° C for one-half to ten hours.

2. The process of claim 1 wherein said 4-sulfophthalic acid or salt thereof is selected from the group consisting of triammonium-4-sulfophthalate, 4-sulfophthalic acid, sodium-4-sulfophthalate, and disodium-4-sulfophthalate.

3. The process of claim 1 wherein said metal salt is selected from the group consisting of cobalt sulfate heptahydrate, vanadyl sulfate, manganese sulfate, and rhodium nitrate.

4. The process of claim 1 wherein said ammonium donor is either urea or hydrazine.

5. The process of claim 1 wherein the catalyst preparation reaction includes a promoter.

6. The process of claim 5 wherein the promoter is selected from ammonium molybdate, molybdic acid, and boric acid.

7. The process of claim 6 wherein prior to heating at 255° to 325° C for one-half to ten hours, the mixture is first heated at 120° to 150° C for one-half to two hours and then at 150° to 250° C for one-half to two hours.

8. A process for sweetening a sour hydrocarbon distillate containing mercaptans comprising contacting said distillate with an alkaline medium and a catalyst comprising a metal phthalocyanine composition prepared by reacting (a) a 4-sulfophthalic acid or salt thereof, with salt (b) a metal selected from the group consisting of a Group VIII metal, vanadium and manganese, (c) an ammonium donor compound decomposable to ammonia or ammonium moiety, and (d) water, at a temperature of 255° to 325° C for one-half to ten hours, and contacting said alkaline medium containing catalyst with an oxidizing agent to oxidize mercaptans to disulfides in said medium, said recovering a hydrocarbon distillate with reduced mercaptan sulfur content.

9. Process of claim 8 wherein said catalyst is dispersed in an alkaline medium of an aqueous solution of NaOH of pH 8 to 14.

10. Process of claim 8 wherein said catalyst is composited with a charcoal carrier and the catalyst and charcoal composite is wetted with an aqueous solution of NaOH of pH 8 to 14.

* * * * *